United States Patent [19]

Dorricott et al.

[11] Patent Number: 5,387,937
[45] Date of Patent: Feb. 7, 1995

[54] MOTION COMPENSATION FOR COLOR VIDEO SIGNALS

[75] Inventors: Martin R. Dorricott, Basingstoke; Morgan W. A. David, Farnham, both of England

[73] Assignee: Sony United Kingdom Limited, Staines

[21] Appl. No.: 451

[22] Filed: Jan. 4, 1993

[30] Foreign Application Priority Data

Feb. 13, 1992 [GB] United Kingdom ............... 9203003

[51] Int. Cl.[6] .............. H04N 7/133; H04N 11/04; H04N 11/20
[52] U.S. Cl. ..................... 348/395; 348/453; 348/699; 348/407; 364/725
[58] Field of Search ............. 348/384, 391, 403, 453, 348/699, 395, 407; H04N 7/133, 11/04, 11/20; 364/725

[56] References Cited

U.S. PATENT DOCUMENTS

| | | | |
|---|---|---|---|
| 4,447,886 | 5/1984 | Meeker | 348/403 |
| 5,140,416 | 8/1992 | Tinkler | 348/586 |
| 5,175,617 | 12/1992 | Wallace | 348/384 |

*Primary Examiner*—Howard W. Britton
*Attorney, Agent, or Firm*—William S. Frommer; Alvin Sinderbrand

[57] ABSTRACT

A motion compensation technique for color video signals involves deriving at least one principal component from the video signals by means of a hotelling transform circuit and a matrix, and applying motion compensation to an interpolator (or to a compressor/decompressor) on the basis of the derived principal component. The technique avoids the need to provide three separate compensation circuits for each of the video signals while ensuring that optimum use is made of the color information in the video signals.

39 Claims, 5 Drawing Sheets

MOTION COMPENSATION FOR COLOR VIDEO SIGNALS

BACKGROUND OF THE INVENTION

1. Field of the Invention

This invention relates to motion compensation for color video signals, and in particular to methods of and apparatus for such motion compensation such as in frame/field rate conversion or in signal compression/de-compression during video signal processing.

2. Description of the Prior Art

It is known in video processing to analyse the video image for stationary and moving parts of the image. This technique involves stationary parts of the image being repeated from frame to frame (or field to field) and the moving parts being defined by motion vectors mapping the movement of those parts. On the basis of such analysis, it is unnecessary to provide complete data for each separate frame of the video image; data relating to stationary parts of the image may be stored and then repeated, whereas data relating to moving parts may likewise be stored and repeated but with changing co-ordinates in successive frames/fields depending on the corresponding motion vectors. The motion compensation algorithms are generally based on inter-frame/field comparisons to select motion vectors for objects within the image.

One application of this technique is in image compression for transmission or storage. By repeating the stationary parts of the image at the same co-ordinates in successive frames/fields, and by repeating the moving parts of the image at co-ordinates changing in accordance with the motion vectors, a significant amount of data rate reduction can be achieved thereby compressing the video signal to be transmitted or stored. Upon reception or reproduction of the compressed video signal, the image can be reconstructed on the basis of the repeating co-ordinate information and the motion vectors.

Another application of this technique is in frame/field rate conversion when a video signal (for example, of one standard) at a particular frame/field rate needs to be converted into a video signal (for example, of another standard) at a different frame/field rate. It is then necessary to interpolate frames/fields between those defined by the original signal, and the use of motion compensation as described above is very effective in providing such interpolated images.

UK Patent Application Publication No. 2 231 228 A (the contents of which are incorporated herein by reference) discloses one way in which such motion vectors can be generated, and how data interpolation can be performed on the basis of the motion vectors.

Color video images, are represented by three orthogonal signal components, for example red (R), green (G) and blue (B), or combinations of these such as luminance (Y) and color difference components ($C_R$, $C_B$).

In order to obtain the optimum performance in motion compensation for color video signals, respective motion compensation algorithms should in theory be applied to all three components, this requiring individual application of the algorithm to each component and then combination of the three individual results. In practice, this involves an unacceptable usage of signal processing capability, and hence it is usual for only one component to be analysed. This results in a sub-optimal system being produced, the performance of which depends on the picture color content and the component which has been chosen. Typically, the luminance component is chosen as the single component for analysis. In this case, important information may be ignored in a brightly and distinctly colored scene. The luminance component is generally composed of 59% green, 30% red and 11% blue. Thus, in a luminance-only system, a predominantly blue scene (or, to a lesser extent, a predominantly red scene) will provide sub-optimal performance in view of the low proportion of the color contributing to the luminarice, leading to low levels of both the dynamic range of the input to the processor and also the signal-to-noise ratio.

SUMMARY OF THE INVENTION

It is an object of the invention to provide a method and an apparatus for motion compensation for color video signals in which the defects of the prior art approach arising from using a single available component to produce the motion vectors can be overcome or at least alleviated.

It is another object of the invention to provide a method and an apparatus for motion compensation for color video signals, the performance of which is independent of any particular color predominance in the scene.

It is a further object of the invention to provide a method and an apparatus for motion compensation for color video signals in which both the dynamic range of the input to the processing circuitry and also the signal-to-noise ratio can be improved.

According to one aspect of the invention there is provided a method of motion compensation for color video signals, the method comprising deriving at least one principal component from the video signals by hotelling transformation thereof, and performing motion compensation on the basis of the derived principal component.

According to another aspect of the invention there is provided apparatus for frame/field rate conversion of color video signals, the apparatus comprising hotelling transform means for deriving at least one principal component from the video signals, motion compensation means for providing a motion compensation signal on the basis of the derived principal component, and interpolation means for interpolating the video signals at a different frame/field rate to that of the input video signals on the basis of the motion compensation signal.

According to a further aspect of the invention there is provided apparatus for compression/de-compression of color video signals, the apparatus comprising hotelling transform means for deriving at least one principal component from the video signals, motion compensation means for providing a motion compensation signal on the basis of the derived principal component, compression means for compressing the video signals on the basis of the motion compensation signal, and de-compression means for de-compressing the compressed video signals on the basis of the motion compensation signal.

The use of the hotelling transform, which can be used to define a coordinate system based on a main principal component which is statistically predominant, ensures that a color component having the maximum information at that time is used to derive the motion compensation algorithm. Since the color component can continuously change to suit the image, the best possible use will be made of the color information in each image for motion compensation.

The hotelling transform is described in more detail in "Analysis of a Complex of Statistical Variables into Principal Components", Hotelling H (1933), Journal of Educational Psychology, Vol. 24, pp 417-441 and pp 498-520, and in "Digital Image Processing" (2nd Edition), Rafael C Gonzalez and Paul Wintz, publ. Addison Wesley ISBN 0-201-11026-1, pp 122-125 and pp 322-329. The hotelling transform can also be referred to as the eigen-vector, principal component or discrete Karhunen-Loeve transform.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
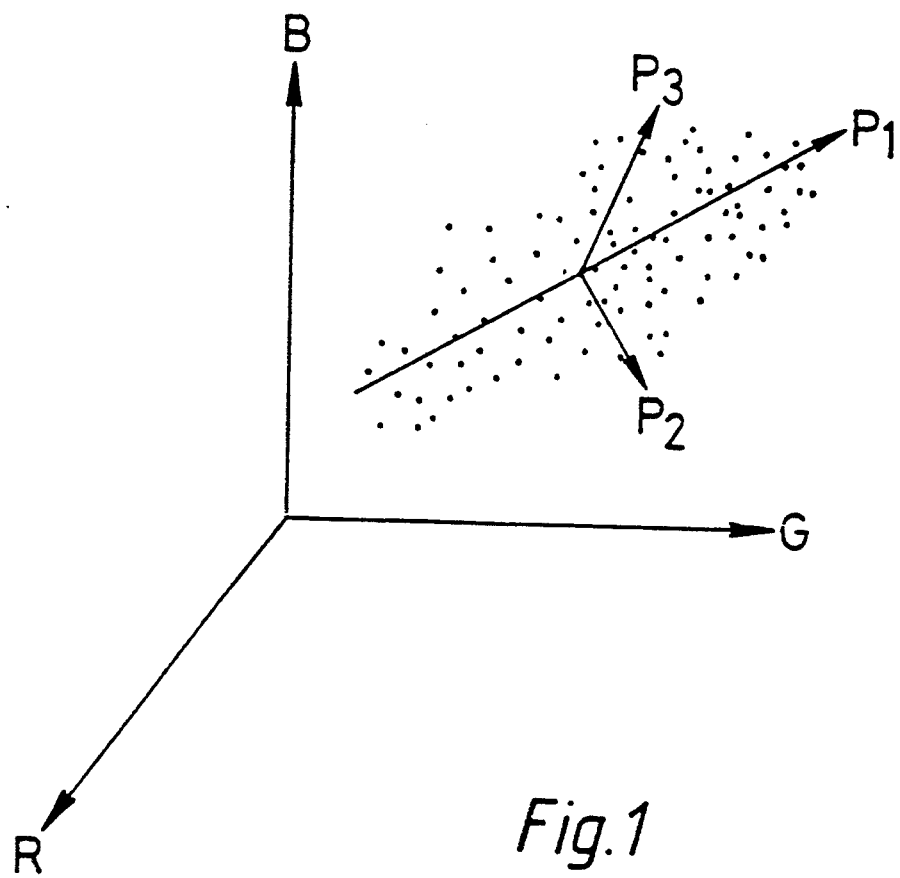
FIG. 1 is a pixel plot of a typical image on a three color coordinate system showing principal components.

Referring to FIG. 1, there is shown an example of typical color picture information in the form of a pixel plot arranged on a three color coordinate system, in this case red (R), blue (B) and green (G). It can be shown that any scatter plot of pixels, such as that shown in FIG. 1, can be resolved into three principal components, one component $P_1$ representing the maximum information of the scatter plot. In other words, the component $P_1$ represents the maximum average information content of the particular picture being considered. Likewise, the component $P_2$ is chosen as the component orthogonal to $P_1$ which has the next highest information content. Finally, the component $P_3$ is chosen to be orthogonal to $P_1$ and $P_2$. This results in a color coordinate system in which each component contains uncorrelated information to the other two components. According to embodiments of the invention, the manner in which this coordinate system is derived is by means of the hotelling transform which effectively transposes a three coordinate axis system, such as the R, G, B system shown in FIG. 1, into a different three coordinate system, such as the $P_1$, $P_2$, $P_3$ system shown in FIG. 1, in which the main principal axis $P_1$ is statistically predominant.

It will be apparent that the pixel scatter plot of different pictures will vary, in accordance with variation in the color content of each picture, and therefore the principal components will also vary. However, in a relatively slowly moving or otherwise changing picture, the change in the principal components will be correspondingly slow, and therefore this analysis is applicable to video image processing.

Figure 2:
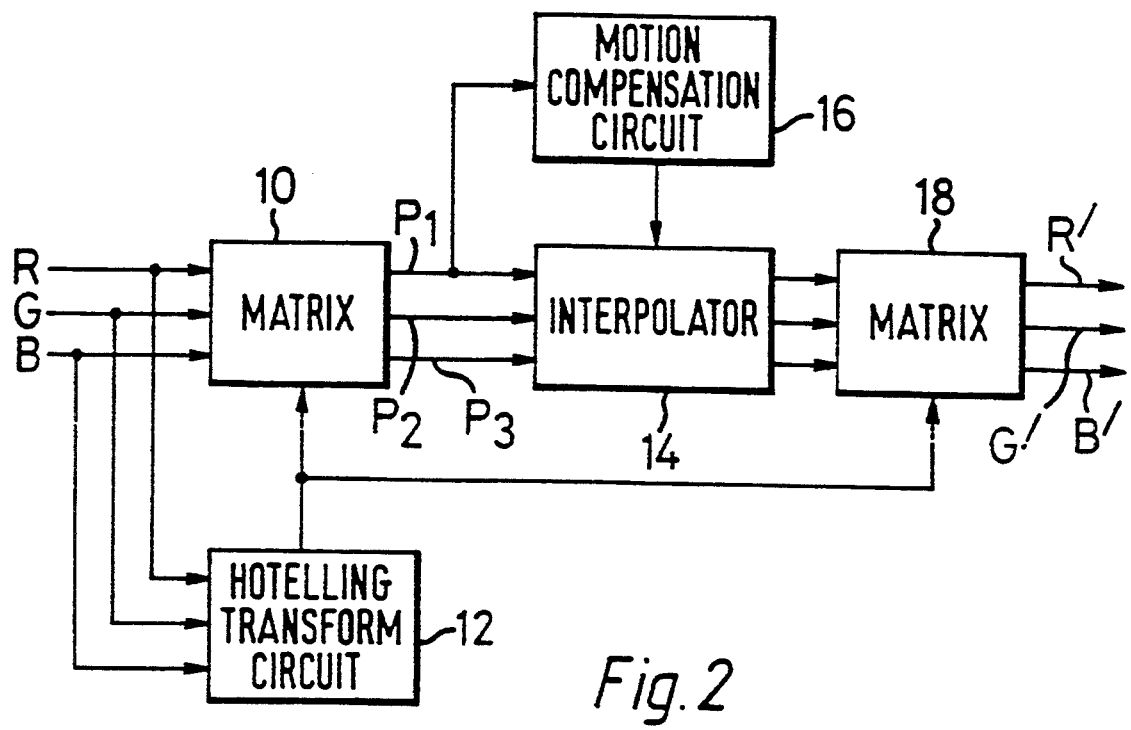
FIG. 2 is a circuit diagram of a motion compensated frame rate converter according to an embodiment of the invention.

FIG. 2 shows a motion compensated frame rate converter of the general type disclosed in the above-mentioned UK Patent Application Publication No. 2 231 228 A, but modified in accordance with an embodiment of the invention. Input video signals R, G, B are supplied to a matrix 10 and also to a hotelling transform circuit 12. The hotelling transform circuit 12 calculates suitable weighting signals in a manner to be described in greater detail below, and supplies the weighting signals to the matrix 10. As a result, principal component signals $P_1$, $P_2$, $P_3$ are formed by the matrix 10 and supplied to an interpolator 14. The main principal component $P_1$ is also supplied to a motion compensation circuit 16. The interpolator 14 and the motion compensation circuit 16 operate in a similar manner to that described in the above-mentioned UK Publication No. 2 231 228 A, except that the principal components $P_1$, $P_2$, $P_3$ are interpolated rather than the R, G, B signals, and also the motion compensation circuit 16 is responsive to the main principal component $P_1$ rather than to the luminance signal. As a result of interpolation by the interpolator 14, the modified principal components, at the required different frame/field rate, are supplied from the interpolator 14 to a matrix 18 which also receives the weighting signals from the hotelling transform circuit 12. These weighting signals are utilised by the matrix 18 to transform the interpolated principal components back to R, G, B form, but at the different frame/field rate, and accordingly the matrix 18 supplies motion compensated and interpolated output video signals R', G', B'.

As outlined above, it is found that the principal component stays approximately constant over time within a scene of a video image. This is important since the motion compensation algorithms require inter-frame comparison. A filter can be added to the output of the hotelling transform circuit 12 in order to limit the rate of change of the weighting signals. This prevents the transposition back of the principal components into R, G, B form from being performed using significantly different weighting signals than those used for the R, G, B to principal component transposition. It also allows block matching to be performed between consecutive frames/fields with similar principal components. However, such filtering results in some reduction in optimality of the principal components.

Figure 3:
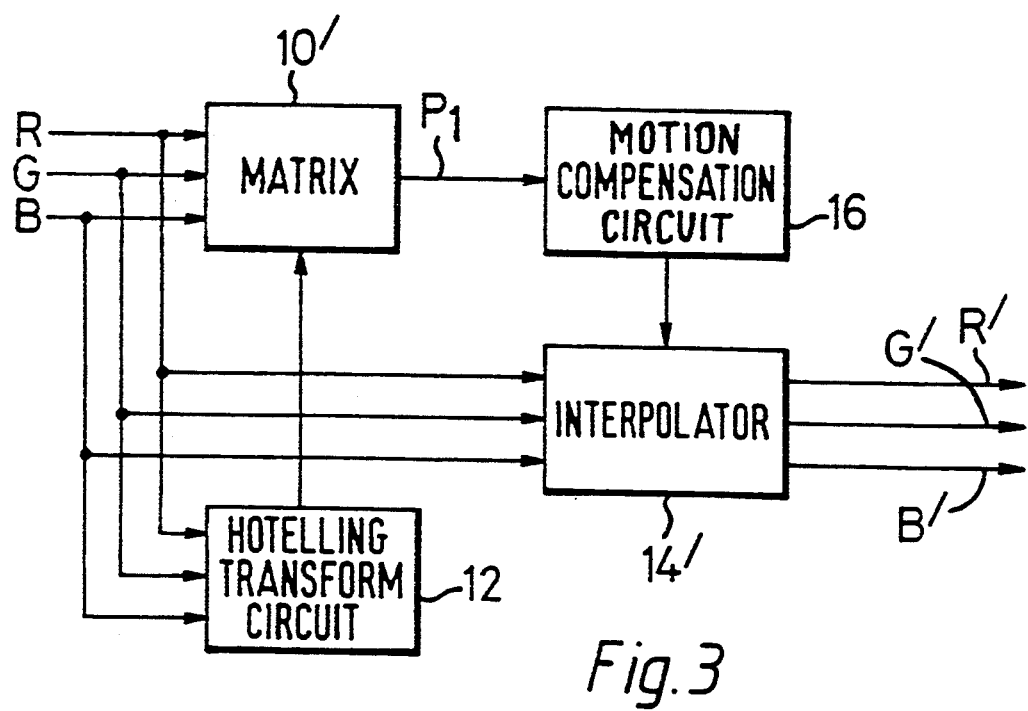
FIG. 3 is a circuit diagram of a different type of motion compensated frame rate converter according to another embodiment.

The circuit shown in FIG. 2 can readily be used with apparatus such as that disclosed in UK Publication No. 2 231 228 A, the apparatus being modified such that the interpolator receives principal component signals rather than R, G, B signals, and the motion compensation circuit receiving the main principal component. A different implementation is shown in FIG. 3. In this circuit, input video signals R, G, B are once more supplied to a matrix 10' and to the hotelling transform circuit 12. However, the input video signals are also supplied direct to an interpolator 14'. The hotelling transform circuit 12 provides weighting signals to the matrix 10' as a result of which the main principal component $P_1$ is formed and supplied to the motion compensation circuit 16. The motion compensation circuit 16 calculates the motion vectors based on the motion compensation algorithm and supplies them to the interpolator 14'. The interpolator 14' operates to interpolate directly the input video signals R, G, B so as to provide output video signals R', G', B' at the required different frame/-field rate. The advantage of the circuit shown in FIG. 3 is that the video path of the signals R, G, B remains untransformed in the original component scheme. This avoids rounding errors in the matrix. Also, the circuitry of the matrix can be somewhat simplified, since only the main principal component $P_1$ needs to be formed.

Figure 4:
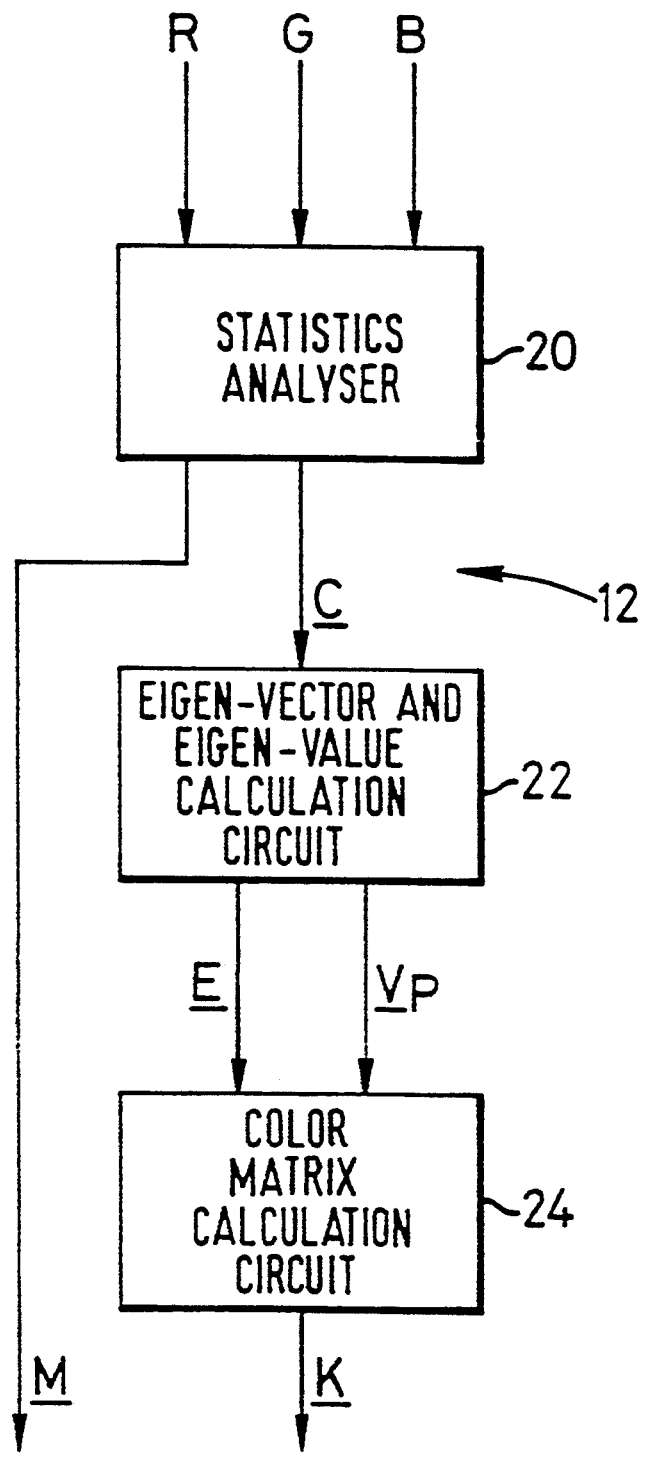
FIG. 4 is a block diagram of one implementation of a hotelling transform circuit in FIGS. 2 and 3.

FIG. 4 shows one implementation of the hotelling transform circuit 12 in greater detail. The input video signals R, G, B are supplied to a statistics analyser 20 which operates to calculate the mean value vector $\underline{M}$ of the three R, G, B components, and also the covariance values between the three components. Thus, if the mean values of each of the R, G, B components are $\overline{R}, \overline{G}, \overline{B}$ respectively, the mean value vector $$M = \begin{pmatrix} \overline{R} \\ \overline{G} \\ \overline{B} \end{pmatrix}$$

An eigen-vector and eigen-value calculation circuit 22 receives a 3×3 covariance matrix $\underline{C}$ formed of the covariance values from the statistics analyser 20 and calculates its eigen-vectors $\underline{V}_P$ and eigen-values $\underline{E}$. The eigen-vector and eigen-value calculation circuit 22 can conveniently be in the form of an embedded microprocessor. The eigen-vectors $\underline{V}_P$ and eigen-values $\underline{E}$ are supplied to a color matrix calculation circuit 24 which ranks the eigen-vectors $\underline{V}_P$ according to the magnitudes of the corresponding eigen-values $\underline{E}$ and thereby provides the color matrix weighting signals representable by a transformation matrix $\underline{K}$ to be supplied to the matrix 10 and the matrix 18 (FIG. 2) or to the matrix 10' (FIG. 3). In the matrix 18, the transformation matrix $\underline{K}$ is used in inverse form.

Figure 5:
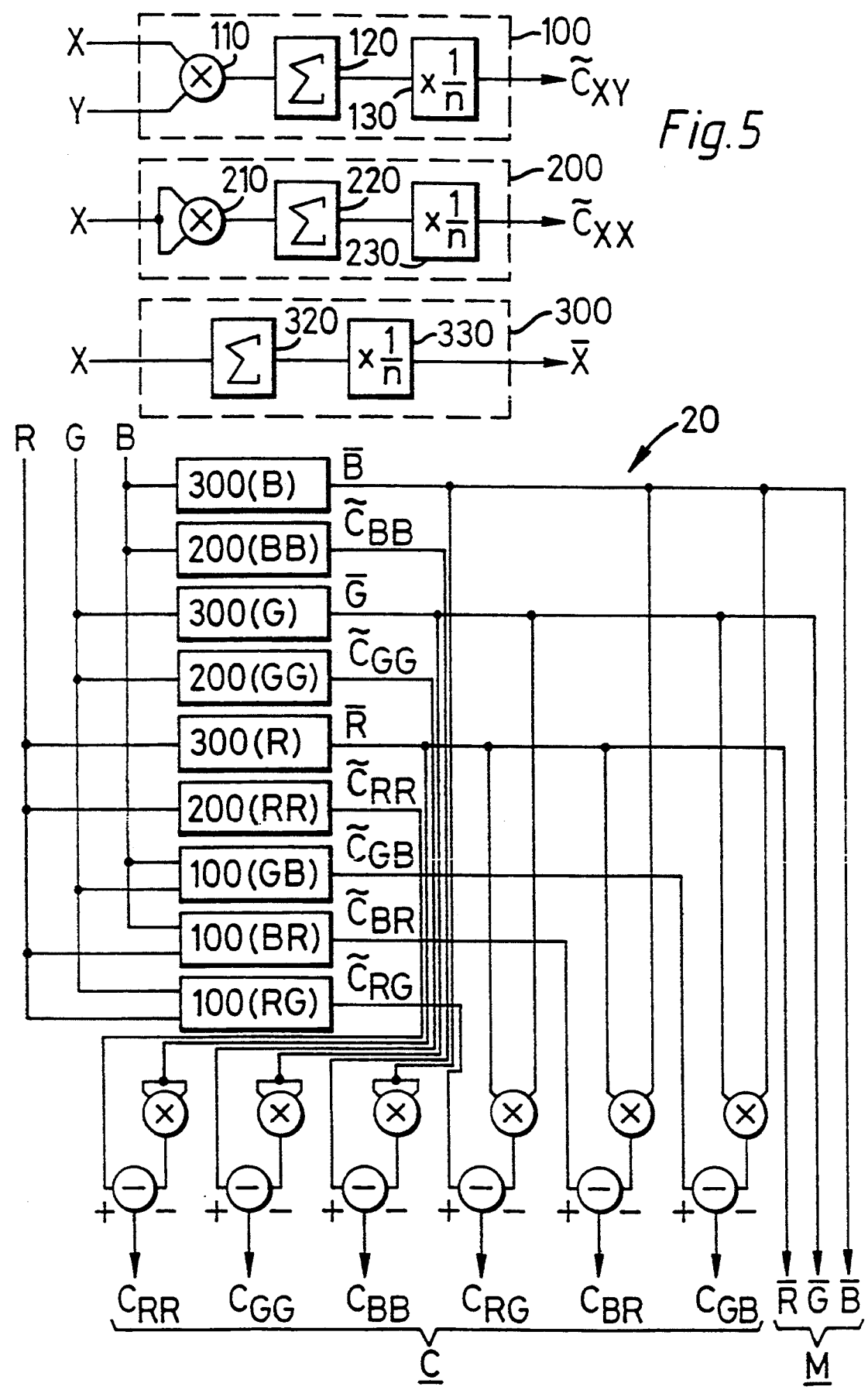
FIG. 5 is a schematic diagram of one implementation of a statistics analyser in FIG. 4.

FIG. 5 shows one version of a statistics analyser 20 of the hotelling transform circuit 12. The statistics analyser 20 uses a number of sub-circuits 100, 200, 300 as shown in the top part of the drawing. Each sub-circuit 100 includes a multiplier 110 receiving signals X, Y to produce the product XY, a summing circuit 120 for summing n values of the product XY, and a divide-by-n circuit 130 for deriving a value $\widetilde{C}_{XY}$ over $\underline{n}$ samples. Each sub-circuit 200 is broadly similar to the sub-circuit 100 except that only one type of signal X is supplied to both inputs of a multiplier 210 in order to generate $X^2$, the value $\widetilde{C}_{XX}$ being derived by the sub-circuit 200. Each sub-circuit 300 sums $\underline{n}$ values of X in a summing circuit 320 and then normalises the summed values in a divide-by-n circuit 330. An averaged sample value $\overline{X}$ is produced by the sub-circuit 300.

It will be seen from the main part of FIG. 5 that the statistics analyser 20 receives the input video signals R, G, B and subjects the signals to processing by the sub-circuits 100, 200, 300 (the signals being operated on by each sub-circuit forming part of the sub-circuit reference) in order to provide the 3×3 covariance matrix $\underline{C}$, which is of the form $$C = \begin{pmatrix} C_{RR} & C_{GR} & C_{BR} \\ C_{GR} & C_{GG} & C_{GB} \\ C_{BR} & C_{GB} & C_{BB} \end{pmatrix}.$$

The configuration of the statistics analyser 20 is based on the calculation $$C_{XY} = \frac{1}{n} \Sigma (X - \overline{X})(Y - \overline{Y})$$

(summation over all image pixels) which can be expanded and simplified as follows.

$$C_{XY} = \frac{1}{n} (\Sigma XY - \Sigma \overline{X} Y - \Sigma X \overline{Y} + \Sigma \overline{X} \overline{Y})$$

$$= \frac{1}{n} (\Sigma XY - \overline{X} \Sigma Y - \overline{Y} \Sigma X + \overline{X} \overline{Y} \Sigma 1)$$

$$= \frac{1}{n} (\Sigma XY - \overline{X} \overline{Y} - \overline{X} \overline{Y} + \overline{X} \overline{Y})$$

(since $\Sigma Y = Y$ and $\Sigma X = X$)

$$= \frac{1}{n} (\Sigma XY - \overline{X} \overline{Y}).$$

These are the calculations performed by the statistics analyser 20 for all combinations of R, G and B, using the intermediate values $\widetilde{C}_{BB}, \widetilde{C}_{GG}, \widetilde{C}_{RR}, \widetilde{C}_{GB}, \widetilde{C}_{BR}$ and $C_{RG}$, where $$\widetilde{C}_{XY} = \frac{1}{n} \Sigma XY$$

and $$\widetilde{C}_{XX} = \frac{1}{n} \Sigma X^2.$$

The statistics analyser 20 also provides the mean value vector $\underline{M}$ of the three components R, G, B in the form of the three individual mean values $\overline{R}, \overline{G}$, and $\overline{B}$.

Returning to FIG. 4, the eigen-vector and eigen-value calculation circuit 22 receives the 3×3 covariance matrix $\underline{C}$ and calculates the eigen-vectors $\underline{V}_P$ and the eigen-values $\underline{E}$ of the matrix $\underline{C}$.

The eigen-vectors $\underline{V}_P$ and the eigen-values $\underline{E}$ are supplied to the color matrix calculation circuit 24 which derives the weighting signal transformation matrix $\underline{K}$ for the matrix circuit(s) from the ranked eigen-vectors $\underline{V}_P$ as will now be described.

It can be shown that, for an image vector $\underline{x}$, hotelling transformation produces a new image vector $\underline{P}$ by multiplication of a centralised image vector $(\underline{x} - \underline{M})$ by the transformation matrix $\underline{K}$, namely $$\underline{P} = \underline{K} (\underline{x} - \underline{M}).$$

In the present case, these vectors represent the following:

$$P = \begin{pmatrix} P_1 \\ P_2 \\ P_3 \end{pmatrix} \quad x = \begin{pmatrix} R \\ G \\ B \end{pmatrix} \quad M = \begin{pmatrix} \overline{R} \\ \overline{G} \\ \overline{B} \end{pmatrix}$$

The transformation matrix $\underline{K}$ is derived by the color matrix calculation circuit 24 as a result of normalisation of the eigen-vectors $\underline{V}_P$ and placing the normalised eigen-vectors in rank order by magnitude of their corresponding eigen-values $\underline{E}$. Thus, $\underline{V}_{P1}$ is the eigen-vector with the greatest eigen-value $\underline{E}_1$, $\underline{V}_{P2}$ is next in rank (with an intermediate eigen-value $\underline{E_2}$) and $\underline{V}_{P3}$ is last (having the smallest eigen-value $\underline{E_3}$).

Thus, $$K = \begin{pmatrix} V_{P1} \\ V_{P2} \\ V_{P3} \end{pmatrix} = \begin{pmatrix} V_{P1R} & V_{P1G} & V_{P1B} \\ V_{P2R} & V_{P2G} & V_{P2B} \\ V_{P3R} & V_{P3G} & V_{P3B} \end{pmatrix}$$

The individual elements of the final $3 \times 3$ matrix then represent the individual weighting values to be applied to the input video signals R, G, B. Thus the weighting values are dependent on the statistical distribution of the color information over all pixels in the picture, and can thus be used to derive the principal components $P_1$, $P_2$, $P_3$ in the matrix from the input video signals R, G, B.

Thus, hotelling transformation of the R, G, B signals in the matrix 10 is in accordance with:

$$\begin{pmatrix} P_1 \\ P_2 \\ P_3 \end{pmatrix} = \begin{pmatrix} V_{P1} \\ V_{P2} \\ V_{P3} \end{pmatrix} \left( \begin{pmatrix} R \\ G \\ B \end{pmatrix} - \begin{pmatrix} \overline{R} \\ \overline{G} \\ \overline{B} \end{pmatrix} \right)$$

Figure 6:
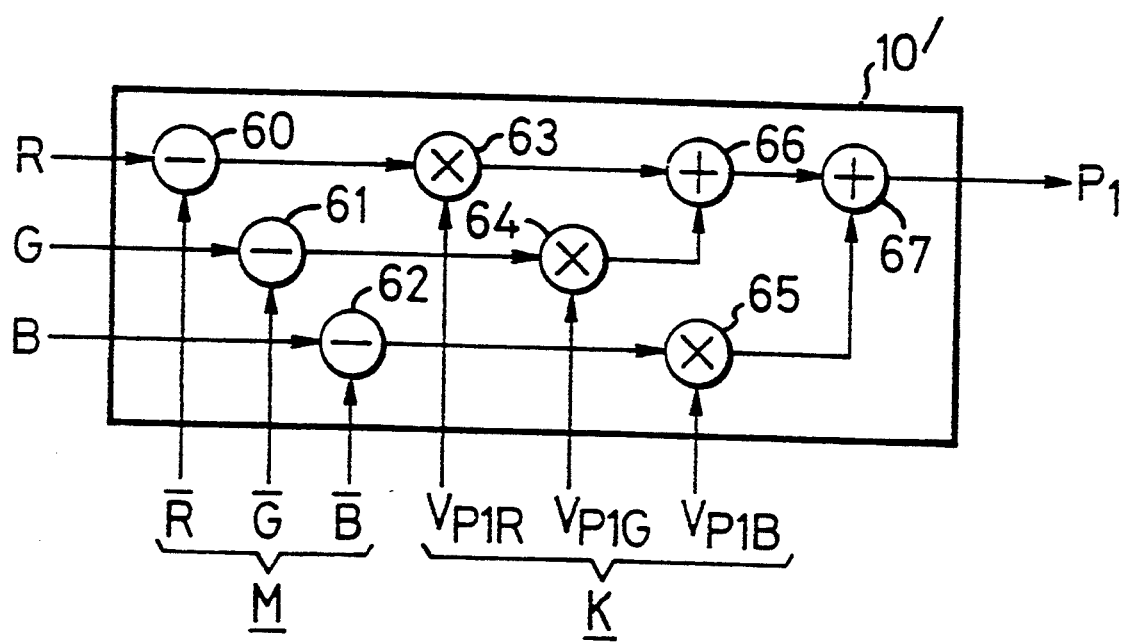
FIG. 6 is a block diagram of a version of a matrix circuit for FIG. 3.

FIG. 6 shows one implementation of the matrix 10' of FIG. 3. The matrix 10' has been chosen for simplicity since only the main principal component $P_1$ needs to be obtained. The input video signals R, G, B are respectively supplied to subtraction circuits 60, 61, 62 which receive the mean values $\overline{R}$, $\overline{G}$, $\overline{B}$ respectively at their subtraction inputs. Thus the subtraction circuits 60, 61, 62 derive $$\begin{pmatrix} R \\ G \\ B \end{pmatrix} - \begin{pmatrix} \overline{R} \\ \overline{G} \\ \overline{B} \end{pmatrix}.$$

The weighting signal values of the transformation matrix $\underline{K}$ in FIG. 6 comprise values $V_{P1R}$, $V_{P1G}$, $V_{P1B}$ from the color matrix calculation circuit 24, these being respectively applied to multipliers 63, 64, 65. The difference signals from the subtraction circuits 60, 61, 62 are supplied to the other inputs of the respective multipliers 63, 64, 65. The thus-weighted signals are then supplied from the multipliers 63, 64, 65 to summing circuits 66, 67 in which the three weighted signals are added together to form the principal component $P_1$.

If all three components $P_1$, $P_2$, $P_3$ are required, as for the circuit of FIG. 2, the circuit of FIG. 6 must be expanded to provide three separate component paths, each similar to that shown in FIG. 6, and the weighting signal values of the transformation matrix $\underline{K}$ will then consist of nine values ($3 \times 3$ matrix) applied to respective multipliers.

The above-described embodiments involve application of the hotelling transform to frame/field rate conversion circuits. A similar technique can be used in video signal compression/de-compression for transmission or storage.

Figure 7:
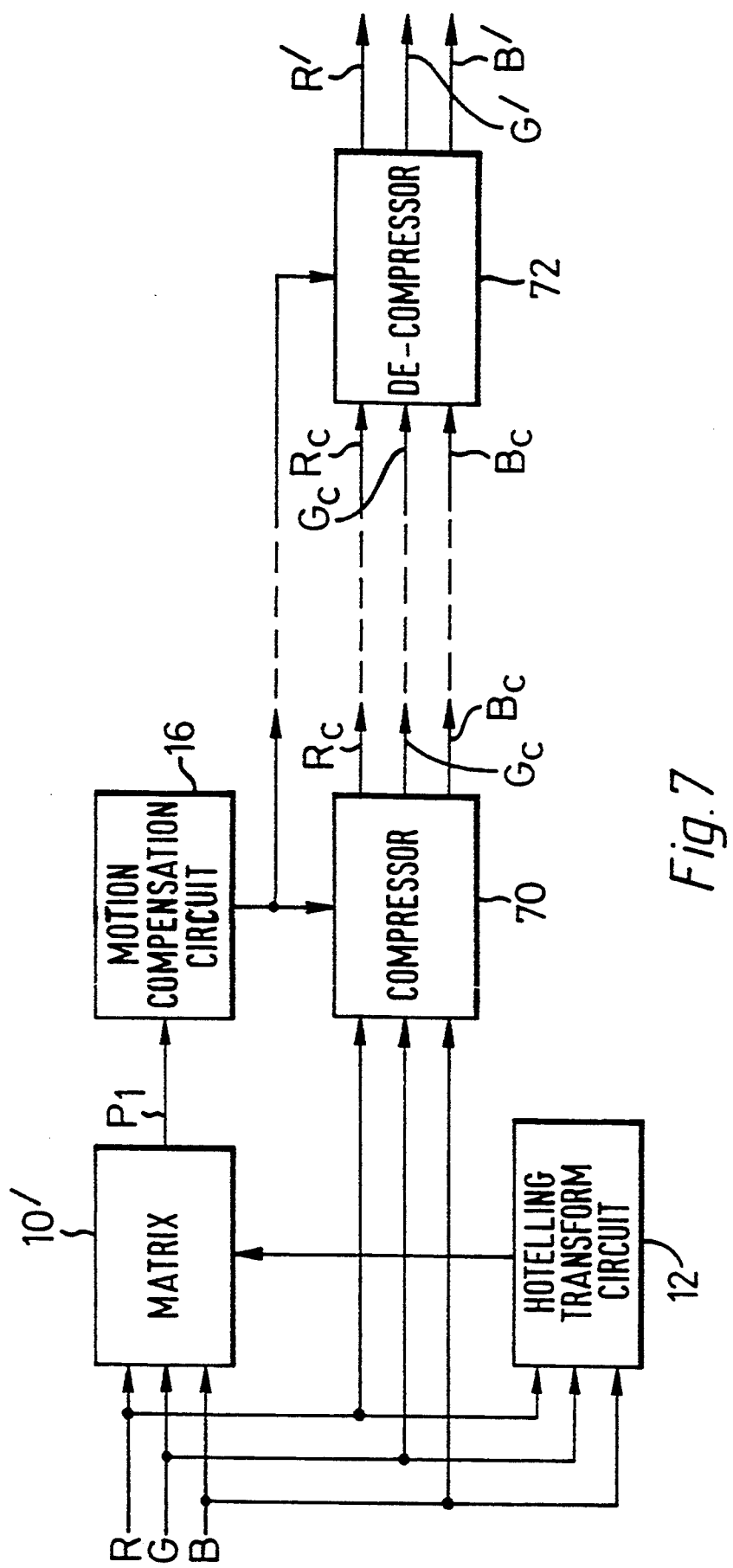
FIG. 7 is a circuit diagram of a compressor/de-compressor according to a further embodiment of the invention.

FIG. 7 shows a video signal compression/de-compression circuit according to another embodiment of the invention. Input video signals R, G, B are supplied (as in FIG. 3) to the matrix 10' and to the hotelling transform circuit 12. The input video signals R, G, B are also supplied to a compressor 70. The hotelling transform circuit 12 provides weighting signals to the matrix 10' as a result of which the main principal component $P_1$ is formed and supplied to the motion compensation circuit 16. The motion compensation circuit 16 calculates the motion vectors in accordance with the motion compensation algorithm based on the principal component $P_1$ and supplies them to the compressor 70. The compressor 70 performs compression of the input video signals R, G, B based on the motion information including the motion vectors and supplies output compressed video signals $R_C$, $G_C$, $B_C$ for transmission or recording, for example. The motion information must also be transmitted or recorded as part of the output video signals.

Upon reception or reproduction of the compressed video signals $R_C$, $G_C$, $B_C$ and of the motion information, the signals are de-compressed by a de-compressor 72 on the basis of the motion information to produce output video signals R', G', B' which may be of a similar format to the input video signals R, G, B.

The FIG. 7 compression/de-compression circuit is based on the FIG. 3 circuit in that the main video path of the signals R, G, B remains untransformed in the original component scheme. This is a particularly advantageous configuration for transmission or recording of the signals, since only the motion information needs to be transmitted or recorded together with the compressed signals. It would be possible to derive a compression/de-compression circuit from that of FIG. 2, but in that case, the second (output) matrix would need to be provided on the reception/reproduction side of the apparatus; consequently, the weighting signals from the hotelling transform circuit 12 would need to be transmitted/recorded as well as the compressed video signals and the motion information. This increased need to transmit/record control signals results in a data rate reduction and thus the circuit of FIG. 7 is preferred.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of motion compensating color video signals represented by a first set of signal components comprising the steps of:

generating weighting coefficients as a function of the distribution of color information of a picture by performing a Hotelling transform on the first set of signal components;

deriving at least a first principal component of a second set of signal components from said first set of signal components as a function of said weighting coefficients, said first principal component representing a direction having maximum average color information content of the picture;

calculating motion vectors of the picture from said first principal component; and generating first motion compensated signal components as a function of said motion vectors.

2. A method according to claim 1, wherein said step of generating motion compensated signal components includes the step of motion compensating said first set of signal components such that said first motion compensated signal components correspond to said first set of signal components.

3. A method according to claim 1, further comprising the steps of:
  deriving a second principal component of said second set of signal components from said first set of signal components as a function of said weighting coefficients, said second principal component representing a direction orthogonal to said first principal component having maximum average color information content; and
  deriving a third principal component of said second set of signal components from said first set of signal components as a function of said weighting coefficients, said third principal component representing a direction orthogonal to said first principal component and to said second principal component.

4. A method according to claim 3, wherein said step of generating first motion compensated signal components includes the step of motion compensating said second set of signal components such that said first motion compensated signal components correspond to said second set of signal components.

5. A method according to claim 4, further comprising the step of generating second motion compensated signal components from said first motion compensated signal components as a function of said weighting coefficients, wherein said second motion compensated signal components correspond to said first set of signal components.

6. A method according to claim 1, wherein said step of generating weighting coefficients includes deriving covariance values from said first set of signal components.

7. A method according to claim 6, wherein said step of generating weighting coefficients further includes calculating mean values of said first set of signal components.

8. A method according to claim 6, wherein said step of generating weighting coefficients includes deriving eigen-vectors and eigen-values of said covariance values.

9. A method according to claim 8, wherein said step of generating weighting coefficients includes deriving said weighting coefficients from said eigen-vectors and said eigen-values.

10. A method of field/frame converting color video signals represented by a first set of signal components comprising the steps of:
  generating weighting coefficients as a function of the distribution of color information of a picture by performing a Hotelling transform on the first set of signal components;
  deriving at least a first principal component of a second set of signal components from said first set of signal components as a function of said weighting coefficients, said first principal component representing a direction having maximum average color information content of the picture;
  calculating motion vectors of the picture from said first principal component; and
  generating first motion compensated and interpolated signal components as a function of said motion vectors.

11. A method according to claim 10, wherein said step of generating weighting coefficients includes deriving covariance values from said first set of signal components; calculating mean values of said first set of signal components; deriving eigen-vectors and eigen-values of said covariance values; and deriving said weighting coefficients from said eigen-vectors and said eigen-values.

12. A method according to claim 10, further comprising the steps of:
  deriving a second principal component of said second set of signal components from said first set of signal components as a function of said weighting coefficients, said second principal component representing a direction orthogonal to said first principal component having maximum average color information content;
  deriving a third principal component of said second set of signal components from said first set of signal components as a function of said weighting coefficients, said third principal component representing a direction orthogonal to said first principal component and to said second principal component; and
  generating second motion compensated and interpolated signal components corresponding to said first set of signal components from said first motion compensated signal and interpolated signal components as a function of said weighting coefficients; and
  wherein said first motion compensated and interpolated signal components are interpolated from said second set of signal components and correspond to said second set of signal components.

13. A method according to claim 10, wherein said step of generating first motion compensated and interpolated signal components includes the step of interpolating said first set of signal components, and said first motion compensated and interpolated signal components correspond to said first set of signal components.

14. A method of compressing color video signals represented by a first set of signal components comprising the steps of:
  generating weighting coefficients as a function of the distribution of color information of a picture by performing a Hotelling transform on the first set of signal components;
  deriving at least a first principal component of a second set of signal components from said first set of signal components as a function of said weighting coefficients, said first principal component representing a direction having maximum average color information content of the picture;
  calculating motion vectors of the picture from said first principal component; and
  motion compensating and compressing said first set of signal components as a function of said motion vectors to generate motion compensated and compressed signal components corresponding to said first set of signal components.

15. A method according to claim 14, wherein said step of generating weighting coefficients includes deriving covariance values from said first set of signal components; calculating mean values of said first set of signal components; deriving eigen-vectors and eigen-values of said covariance values; and deriving said weighting coefficients from said eigen-vectors and said eigen-values.

16. A method according to claim 14, further comprising the step of recording said first motion compensated and compressed signal components and said motion vectors on a recording medium.

17. A method according to claim 16, further comprising the steps of reproducing said first motion compensated and compressed signal components and said motion vectors from said recording medium; and decompressing said first motion compensated and compressed signal components as a function of said motion vectors to generate second motion compensated signal components corresponding to said first set of signal components.

18. A method according to claim 14, further comprising the step of transmitting said first motion compensated and compressed signal components and said motion vectors.

19. A method according to claim 18, further comprising the steps of receiving said first motion compensated and compressed signal components and said motion vectors; and decompressing said first motion compensated and compressed signal components as a function of said motion vectors to generate second motion compensated signal components corresponding to said first set of signal components.

20. An apparatus for motion compensating color video signals represented by a first set of signal components comprising:
means for generating weighting coefficients as a function of the distribution of color information of a picture by performing a Hotelling transform on the first set of signal components;
means for deriving at least a first principal component of a second set of signal components from said first set of signal components as a function of said weighting coefficients, said first principal component representing a direction having maximum average color information content of the picture;
means for calculating motion vectors of the picture from said first principal component; and
means for generating first motion compensated signal components as a function of said motion vectors.

21. An apparatus according to claim 20, wherein said means for generating motion compensated signal components is responsive to said first set of signal components, said first motion compensated signal components corresponding to said first set of signal components.

22. Apparatus according to claim 20, wherein said means for deriving at least a first principal component includes a matrix circuit.

23. An apparatus according to claim 20, further comprising:
means for deriving a second principal component of said second set of signal components from said first set of signal components as a function of said weighting coefficients, said second principal component representing a direction orthogonal to said first principal component having maximum average color information content; and
means for deriving a third principal component of said second set of signal components from said first set of signal components as a function of said weighting coefficients, said third principal component representing a direction orthogonal to said first principal component and to said second principal component.

24. An apparatus according to claim 23, wherein said means for generating first motion compensated signal components is responsive to said second set of signal components, said first motion compensated signal components corresponding to said second set of signal components.

25. An apparatus according to claim 24, further comprising means for generating second motion compensated signal components from said first motion compensated signal components as a function of said weighting coefficients, wherein second motion compensated signal components correspond to said first set of signal components.

26. Apparatus according to claim 20, wherein said means for generating weighting coefficients includes means for deriving covariance values from said first set of signal components.

27. Apparatus according to claim 26, wherein said means for generating weighting coefficients includes means for calculating mean values of said first set of signal components.

28. Apparatus according to claim 26, wherein said means for generating weighting coefficients includes means for deriving eigen-vectors and eigen-values of said covariance values.

29. Apparatus according to claim 28, wherein said means for generating weighting coefficients includes means for deriving said weighting coefficients from said eigen-vectors and said eigen-values.

30. An apparatus for field/frame converting color video signals represented by a first set of signal components comprising:
means for generating weighting coefficients as a function of the distribution of color information of a picture by performing a Hotelling transform on the first set of signal components;
means for deriving at least a first principal component of a second set of signal components from said first set of signal components as a function of said weighting coefficients, said first principal component representing a direction having maximum average color information content of the picture;
means for calculating motion vectors of the picture from said first principal component; and
means for generating first motion compensated and interpolated signal components as a function of said motion vectors.

31. An apparatus according to claim 30, wherein said means for generating weighting coefficients includes means for deriving covariance values from said first set of signal components; means for calculating mean values of said first set of signal components; means for deriving eigen-vectors and eigen-values of said covariance values; and means for deriving said weighting coefficients from said eigen-vectors and said eigen-values.

32. An apparatus according to claim 30, further comprising:
means for deriving a second principal component of said second set of signal components from said first set of signal components as a function of said weighting coefficients, said second principal component representing a direction orthogonal to said first principal component having maximum average color information content;
means for deriving a third principal component of said second set of signal components from said first set of signal components as a function of said weighting coefficients, said third principal component representing a direction orthogonal to said first principal component and to said second principal component; and
means for generating second motion compensated and interpolated signal components corresponding to said first set of signal components from said first motion compensated signal and interpolated signal components as a function of said weighting coefficients; and wherein said first motion compensated and interpolated signal components are interpolated from said second set of signal components and correspond to said second set of signal components.

33. An apparatus according to claim 30, wherein said means for generating first motion compensated and interpolated signal components includes means for interpolating said first set of signal components, said first motion compensated and interpolated signal components corresponding to said first set of signal components.

34. An apparatus for compressing color video signals represented by a first set of signal components comprising the steps of:

means for generating weighting coefficients as a function of the distribution of color information of a picture by performing a Hotelling transform on the first set of signal components;

means for deriving at least a first principal component of a second set of signal components from said first set of signal components as a function of said weighting coefficients, said first principal component representing a direction having maximum average color information content of the picture;

means for calculating motion vectors of the picture from said first principal component; and means for motion compensating and compressing said first set of signal components as a function of said motion vectors to generate motion compensated and compressed signal components corresponding to said first set of signal components.

35. An apparatus according to claim 34, wherein said means for generating weighting coefficients includes means for deriving covariance values from said first set of signal components; means for calculating mean values of said first set of signal components; means for deriving eigen-vectors and eigen-values of said covariance values; and means for deriving said weighting coefficients from said eigen-vectors and said eigen-values.

36. An apparatus according to claim 34, further comprising means for recording said first motion compensated and compressed signal components and said motion vectors on a recording medium.

37. An apparatus according to claim 36, further comprising means for reproducing said first motion compensated and compressed signal components and said motion vectors from said recording medium; and means for decompressing said first motion compensated and compressed signal components as a function of said motion vectors to generate second motion compensated signal components corresponding to said first set of signal components.

38. An apparatus according to claim 34, further comprising means for transmitting said first motion compensated and compressed signal components and said motion vectors.

39. An apparatus according to claim 38, further comprising means for receiving said first motion compensated and compressed signal components and said motion vectors; and means for decompressing said first motion compensated and compressed signal components as a function of said motion vectors to generate second motion compensated signal components corresponding to said first set of signal components.

* * * * *